(12) United States Patent
Hong

(10) Patent No.: US 11,809,871 B2
(45) Date of Patent: Nov. 7, 2023

(54) DYNAMIC FRAGMENTED ADDRESS SPACE LAYOUT RANDOMIZATION

(71) Applicant: Raytheon Company, Waltham, MA (US)

(72) Inventor: Patrick W. Hong, Redondo Beach, CA (US)

(73) Assignee: Raytheon Company, Waltham, MA (US)

(*) Notice: Subject to any disclaimer, the term of this patent is extended or adjusted under 35 U.S.C. 154(b) by 978 days.

(21) Appl. No.: 16/132,698

(22) Filed: Sep. 17, 2018

(65) Prior Publication Data

US 2020/0089502 A1    Mar. 19, 2020

(51) Int. Cl.
*G06F 7/04* (2006.01)
*H04L 9/32* (2006.01)
(Continued)

(52) U.S. Cl.
CPC .............. *G06F 9/3836* (2013.01); *G06F 8/65* (2013.01); *G06F 9/30149* (2013.01);
(Continued)

(58) Field of Classification Search
CPC .. G06F 9/3836; G06F 9/4486; G06F 9/30149; G06F 9/45516; G06F 21/54;
(Continued)

(56) References Cited

U.S. PATENT DOCUMENTS 7,546,430 B1   6/2009  Miller et al.
8,141,162 B2 *  3/2012  Myles ................... G06F 21/606
                                         712/226
(Continued)

FOREIGN PATENT DOCUMENTS

CN     102231180 B    5/2014
TW     201224933 A    6/2012
(Continued)

OTHER PUBLICATIONS

Collberg, Dynamic Path-Based Software Watermarking, Department of Computer Science, University of Arizona, Tucson, AZ 85721, p. 107-118 (Year: 2004).*
(Continued)

*Primary Examiner* — Lewis A Bullock, Jr.
*Assistant Examiner* — Mohammad H Kabir
(74) *Attorney, Agent, or Firm* — Schwegman Lundberg & Woessner, P.A.

(57)    ABSTRACT

A method can include identifying fixed instructions of the instructions and relocatable instructions of the instructions, the fixed instructions reference another instruction of the instructions and the relocatable instructions do not reference another instruction of the instructions, altering the location of the relocatable instructions relative to one another in the memory and add respective reference instructions to the fixed instructions and relocatable instructions that cause the instructions to be executed in a same order as they would be (Continued)

if the location was not altered, and executing the fixed instructions and the relocatable instructions from their altered locations in the medium.

21 Claims, 9 Drawing Sheets

(51) Int. Cl.
*G06F 9/38* (2018.01)
*G06F 9/448* (2018.01)
*G06F 8/65* (2018.01)
*G06F 9/30* (2018.01)
*G06F 9/455* (2018.01)
*G06F 21/54* (2013.01)
*G06F 21/57* (2013.01)
*G06F 21/75* (2013.01)

(52) U.S. Cl.
CPC ........ *G06F 9/4486* (2018.02); *G06F 9/45516* (2013.01); *G06F 21/54* (2013.01); *G06F 21/577* (2013.01); *G06F 21/75* (2013.01); *G06F 2221/033* (2013.01); *G06F 2221/2125* (2013.01)

(58) Field of Classification Search
CPC .. G06F 21/577; G06F 21/75; G06F 2221/033; G06F 2221/2125
See application file for complete search history.

(56) References Cited

U.S. PATENT DOCUMENTS

| | | | |
|---|---|---|---|
| 9,576,138 | B1 | 2/2017 | Boehm et al. |
| 2007/0063745 | A1* | 3/2007 | Leijten .................. G06F 9/3836 327/100 |
| 2008/0028474 | A1* | 1/2008 | Horne .................. H04L 9/3247 726/27 |
| 2011/0307744 | A1* | 12/2011 | Sano .................. G06F 11/2268 714/48 |
| 2018/0046585 | A1 | 2/2018 | Okhravi et al. |

FOREIGN PATENT DOCUMENTS

| | | |
|---|---|---|
| TW | 201227394 A | 7/2012 |
| TW | 202013178 A | 4/2020 |
| WO | WO-2015023502 A1 | 2/2015 |
| WO | WO-2020060662 A1 | 3/2020 |

OTHER PUBLICATIONS

"International Application Serial No. PCT/US2019/041970, International Search Report dated Oct. 21, 2019", 4 pgs.
"International Application Serial No. PCT/US2019/041970, Written Opinion dated Oct. 21, 2019", 7 pgs.
"Taiwanese Application Serial No. 108121111, Office Action dated Jun. 10, 2020", with machine translation, 8 pgs.

* cited by examiner

```
volatile int global_var  202A
void test_func(void) {     202A
    int i = 1;              204A
    int output;
    for (i = 0; i < NUM_ITERS; ++i)   202B
    {
        output = i*2-1;              204B
        output += test_func_2();     202C
        output = output/2;           204C
    } /* end of for loop */          202D / 204D
    global_var = global_var << output;
    global_var += 1;
    global_var *= 2;
```

```
volatile int global_var; 202A
void test_func(void) {          202B
    int i = 1;                  204A
    int output;
    for (i = 0; i < NUM_ITERS; ++i)
    {                           202C
        output = i*2-1;         204B
        output += test_func_2();
        output = output/2;      204C
    } /*end of for loop */      202D
    global_var = global_var << output;  204D
    global_var += 1;
    global_var *= 2;
}
```

↑ 104

```
void test_func(void) {          302A
invalid opcode
for (i = 0; i < NUM_ITERS; ++i) 302B
invalid opcode
output += test_func_2();        302C
invalid opcode
/*end of for loop */            302D
invalid opcode
int i = 1;                      304A
int output;
invalid opcode
output = i*2-1;                 304B
invalid opcode
output = output/2;              304C
invalid opcode
global_var = global_var << output;  304D
global_var += 1;
global_var *= 2;
invalid opcode
```

Top arrangement (after 106):
- 302A: void test_func(void) { invalid opcode
- 302B: for (i = 0; i < NUM_ITERS; ++i) invalid opcode
- 302C: output += test_func_2(); invalid opcode
- 302D: /*end of for loop */ invalid opcode
- 304D: global_var = global_var << output; global_var += 1; global_var *= 2; invalid opcode
- 304B: output = i*2-1; invalid opcode
- 304A: int i = 1; int output; invalid opcode
- 304C: output = output/2; invalid opcode Bottom arrangement:
- 302A: void test_func(void) { invalid opcode
- 302B: for (i = 0; i < NUM_ITERS; ++i) invalid opcode
- 302C: output += test_func_2(); invalid opcode
- 302D: /*end of for loop */ invalid opcode
- 304A: int i = 1; int output; invalid opcode
- 304B: output = i*2-1; invalid opcode
- 304C: output = output/2; invalid opcode
- 304D: global_var = global_var << output; global_var += 1; global_var *= 2; invalid opcode

DYNAMIC FRAGMENTED ADDRESS SPACE LAYOUT RANDOMIZATION

GOVERNMENT RIGHTS

This invention was made with Government support under a Government Contract awarded by a Federal agency. The Government has certain rights in this invention.

TECHNICAL FIELD

Embodiments discussed herein regard devices, systems, and methods for increasing security of a software application. More specifically, embodiments can help guard against code-reuse attacks or other application-based security breaches that require knowledge of locations of entities within the code base.

BACKGROUND

Due, at least in part, to data execution prevention (DEP) that prevents code injection and execution attacks, recent cyberattacks have moved to re-purposing the existing code base of an application to enact their malicious effects. Code-reuse attacks are a common cyberattack technique that re-purpose existing code segments in a code base. Attackers create functional "gadgets" out of the existing code base and execute chains of gadgets to achieve their malicious goals.

The x86 architecture is particularly susceptible to repurposing the code due to its variable length instruction set. By executing from the middle of instructions, rather than executing the instructions in order, new, unintended code fragments can be created. Attackers can create code segments called "gadgets" out of existing code. Gadgets are code sequences that do a basic operation with one or more side effects and end with a return. As chaining gadgets typically require a gadget to end in a jump type instruction, identifying potential gadgets can be achieved through identifying the set of values that correspond to return opcodes (0xc2, 0xc3, 0xca, etc.) or pop+jmp instructions in the instruction set or stream. Identifying enough of these gadgets can allow the attacker to create a Turing complete language. By chaining together gadgets, the attacker can achieve their goals.

Since code reuse attacks require knowledge of the location of the gadgets, code layout randomization techniques have been developed to protect against gadget use by making the gadgets difficult to find. The general class of code layout randomization is termed Address Space Layout Randomization (ASLR). How randomized an ASLR technique makes the code layout is called entropy. Generally, the higher the entropy, the stronger the ASLR technique. ASLR techniques also randomize at different granularities. Finer grained blocks (blocks with fewer instructions) result in a stronger ASLR technique.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

FIG. 2 illustrates, by way of example, a diagram of an embodiment of a simple function broken up into fixed instructions and relocatable instructions.

FIG. 3 illustrates, by way of example, a diagram of an embodiment of the code of FIG. 2 before and after a load operation.

FIG. 4 illustrates, by way of example, a diagram of a load operation that includes randomization of relocatable fragments.

DETAILED DESCRIPTION

Figure 1:
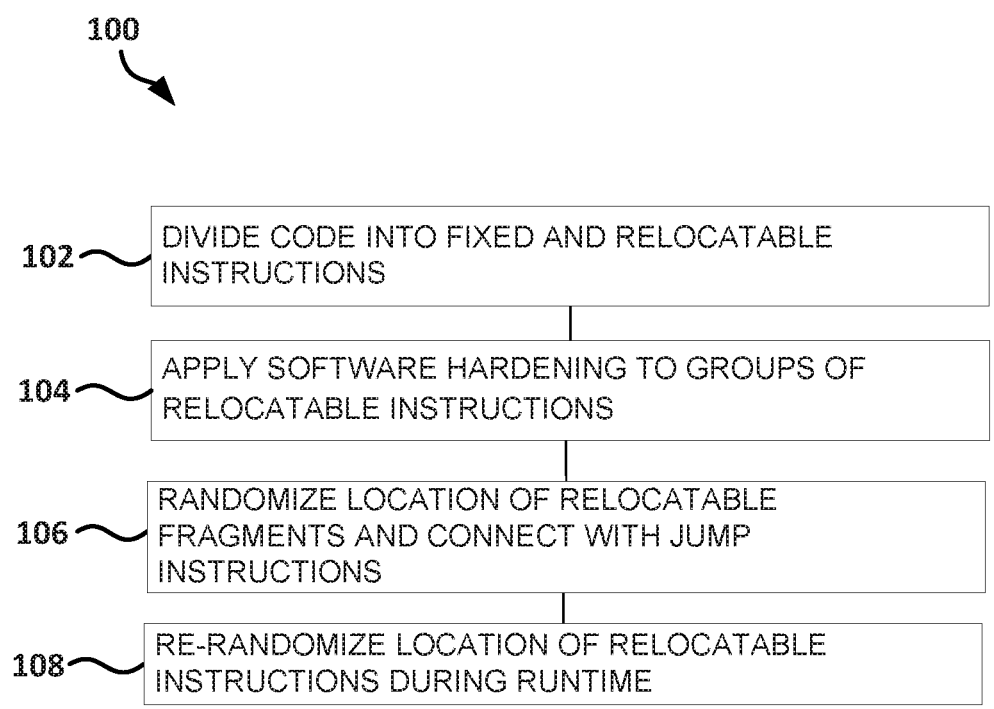
FIG. 1 illustrates, by way of example, a diagram of an embodiment of a method for dynamic fragmented ASLR (DFASLR).

Embodiments generally relate to devices, systems, and methods for reducing a likelihood that a device will be affected adversely by a cyberattack. More specifically, one or more embodiments regard dynamic fragmented ASLR techniques, devices, methods, and machine-readable media.

Cyber intrusion and methods for detecting and preventing cyberattacks are an issue in the world of computing. As systems become more interconnected, the opportunities for cyberattack and resulting payoff for successful cyberattacks are increasing.

As previously discussed, code reuse attacks, such as Return Oriented Programming (ROP) or Jump Oriented Programming (JOP), rely on identifying pieces of code that can be chained together to perform a useful effect for the attacker. These pieces of code are often referred to as "gadgets." Useful gadgets can exist naturally in the code, but additionally, because x86 is a variable length instruction set, unintentional gadgets can be created by executing from the middle of an instruction, effectively creating new instruction streams.

To prevent these types of attacks, code diversity techniques, such as ASLR, have attempted to prevent attackers from finding and using gadgets. ASLR attempts this through code layout randomization and hiding or preventing reading of the code base. ASLR operates by obfuscating the location of gadgets so that the attacker cannot deploy them.

However, not all ASLR techniques are equal. The strength of code layout randomization can be measured by the amount of randomization, or entropy that the code layout randomization technique adds, the granularity of randomization, and the frequency of randomization. Current forms of ASLR and information hiding have been shown to be weak due to low entropy and coarse granularity, and low frequency of randomization making them susceptible to code mapping techniques, such as memory disclosure and side channel attacks.

Different methods for defeating ASLR through reducing the entropy of an ASLR technique exist. Side channel and memory disclosure attacks can defeat most of these ASLR techniques by revealing the location of a known entity within the code base to the attacker. Often, after the attacker has discovered the location of one reference in the code, the attacker can deduce the location of other references in the code. How much the attacker can deduce from the disclosure of a known reference depends on the granularity of the ASLR technique. Examples of current attacks in literature include attacks, such as ASLR and Cache (AnC), which have defeated Windows® and Linux ASLR implementations via side channel attacks.

Modern operating systems such as Android, Windows®, iOS, and Linux ASLR provide coarse grained randomization with low entropy. For example, Windows ASLR and Linux ASLR only randomize at the module, or section boundaries. Examples of module or section boundaries include Dynamically Linked Library (DLL) locations or main executable base addresses. Furthermore, Windows® only provides 24 bits of entropy and Linux ASLR provides only 28 bits of entropy.

For example, consider the Linux ASLR that randomizes the base address of a DLL. If an attacker determines a location of any entity within the base address and knows locations of other instructions relative to the relocated unit, the location of the other instructions can be easily discerned.

Consider another example of a binary stirring ASLR. In a binary stirring ASLR, instructions are moved at a basic block level that includes moving an entire loop, such as an entire for loop (from the entry instruction to the exit of the for loop), or entire if or nested if statement level (from the entry instruction to the execution of a return). A module or section is thus larger than a single assembly code instruction or single machine code instruction level. In embodiments herein, in contrast, instructions within a for loop or instructions within an if-else statement can be relocated separate from the for loop or if-else statement.

Side channel attacks are analysis attacks performed by an attacker on observable effects or objects to infer information about an object of which the attacker cannot directly observe. Side channel cache and side channel page table analysis attacks have been shown to be able to defeat Windows® and Linux ASLR under certain conditions.

Side channel attacks require knowledge of the characteristics and some or all the inputs of the application execution. Blinding is a technique of altering or masking an input into an unpredictable state, thus "blinding" an attacker's knowledge of the inputs prevents side channel analysis.

Embodiments herein, sometimes called Dynamic Fragmented Address Space Layout Randomization (DFASLR), can provide a configurable granularity load time and true runtime code layout randomization. DFASLR can provide randomization down to the individual instruction level, providing the finest granularity/highest entropy ASLR possible. DFASLR also provides a practical, efficient method for runtime re-randomization of the code layout, restoring entropy and providing a moving target for code mapping techniques. Due to the nature of the DFASLR randomization discussed herein, DFASLR can disrupt x86 gadgets, can detect control-flow integrity (CFI) attack attempts, can provide a means of runtime patching, can provide a means for runtime insertion of covert techniques, can provide side-channel blinding, and can help protect a portion of the code base by setting it as execute, no read (XnR).

One can set the executable section as XnR to prevent an attacker from reading the code directly and discovering gadgets. If some vulnerability exists that allows an attacker to read from the code segment, an attack could read and map the code segment to discover gadgets. A reason that executable sections are not set as execute only (XnR) is that executable sections sometimes contain constants and other data that is required to be read by the software. This is primarily done for optimization purposes.

DFASLR, before load time, can separate out labels in the executable section, which includes all of the embedded data in the executable section. This means that there is a clear division: relocatable fragments do not contain anything that has to be read at runtime. If the relocatable fragments are thus placed in different pages than the fixed fragments, then the pages containing the relocatable fragments can be set as XnR, because they contain nothing the software will ever had to read.

Embodiments can separate position independent instructions from the rest of the code base (the position dependent instructions of the code base) and subdivide these relocatable instructions (the position independent instructions) into groupings called relocatable fragments. Software hardening can be applied to one or more of the relocatable fragments, such as by adding an invalid op code (an instruction number that is not supported by the processing architecture at a machine-code level). The relocatable fragments can be relocated (e.g., randomly located) and reconnected, such as by respective reference instructions (e.g., jump instructions), such as at load or run time. Embodiments can provide configurable granularity of randomization, even providing the ability to disjoint and randomize individual instruction locations. Embodiments can allow for true runtime ASLR.

The strength of an ASLR technique also depends on the frequency of randomization. More frequent randomization reduces the lifetime of any references an attacker has discovered. Prior ASLR techniques randomize at load time. Any references discovered by an attacker thus remain valid for the entire program lifetime. The inventor is not aware of any other feasible, generally applicable runtime ASLR. DFASLR runtime randomization reduces the lifetime of references discovered to the period of runtime randomization passes.

Embodiments can offer side-channel blinding. Embodiments can be resistant to the state of the art (SOTA) ASLR attacks such as side-channel analysis and memory disclosure attacks. Embodiments can provide a load time and a runtime ASLR. Embodiments can provide covert technique insertion, gadget smashing capabilities, ROP/JOP traps, and other benefits.

FIG. 1 illustrates, by way of example, a diagram of an embodiment of a method 100 for DFASLR. The method 100 as illustrated includes dividing code of an application into fixed and relocatable instructions, at operation 102; applying software hardening to groups of relocatable instructions, at operation 104; randomizing a location of a relocatable fragment and connecting with jump instructions, at operation 106; and re-randomizing location of relocatable instructions during runtime, at operation 108.

The operation 102 divides up the code segment into fixed and relocatable instructions. FIG. 2 illustrates, by way of example, a diagram of an embodiment of a simple function broken up into fixed instructions 202 and relocatable instructions 204.

During the code dividing of operation 102, all labels and relative references to a label in the code base are identified and declared as fixed instructions 202. A label in this case refers to any instruction that can be jumped to. In terms of a higher-level language, such as C, examples of labels include the first instruction of a function, the instruction at the top of a for loop, the instruction following an if block, and notably the instruction after a function call. The first instruction after a function call is considered a label because it will be referenced by a return instruction. In one or more embodiments, the return instruction of a function call may not be a fixed instruction because although it will reference a label (the return address), it does not reference the label in a relative fashion (e.g., as an offset), instead it references the label by the full address. Labels in the code base can also include embedded data in the code base, which sometimes occurs due to compiler optimization.

After all fixed or relocatable instructions have been identified, the remaining instructions in the code base are relocatable instructions 204A-204D or fixed instructions 202A-202D, respectively. The sets of fixed instructions 202A-D and relocatable instructions 204A-204D can then be passed to the operation 104. Note that, in assembly, the fixed instructions 202A-202B and 202D equate to a single assembly instruction. The fixed instructions 202C equates to two assembly instructions, one assembly instruction for the call to the function, as this is a reference to a label (the function test_func_2) and the next instruction as this is an address that is a label, being used to return to from the call.

In one or more embodiments, the operation 102 can be performed as part of the compilation process, such as by a compiler. Integrating the operation 102 into the compilation provides for an easier implementation of the analysis. A compiler infrastructure, such as LLVM from the LLVM developer group, provides a feasible and rather trivial mechanism for integrating the DFASLR analysis operation 102 into the build process. However, this type of analysis of x86 binaries has been shown to be possible given limited metadata (e.g., symbol table, executable and linkable format (ELF) metadata).

At operation 104, the relocatable instructions 204 can be divided into groups of instructions called relocatable fragments. The relocatable fragments can be any granularity including creating fragments with only a single instruction. At operation 104, software hardening countermeasures can be applied to the relocatable fragments. These software hardening countermeasures can include guard instructions to catch code-reuse attacks or probing and gadget smashing techniques. A guard instruction can include an invalid opcode.

In one or more embodiments, operation 104, is performed during compilation time (sometimes called build time). Operation 104, can receive the output of the operation 102, namely the position independent, relocatable set of instructions 204, and fragments this set into groups of instructions called relocatable fragments. The DFASLR randomization granularity is thus at the fragment level, such as can be as low as the instruction level. Fragmentation granularity can be configurable by the user, up to the point DFASLR can effectively randomize the location of every instruction.

The criteria for fragmentation can be user configurable and can vary depending on the security and performance goals of the user. For example, although maximum security can be achieved by randomizing the location of each relocatable instruction, such a configuration incurs a performance penalty. This is due, at least in part, to the extra branching instructions to connect the fragments and the reduced instruction cache performance. Performance fragmentation criteria may include setting fragmentation to a cache line boundary, such as to better utilize the instruction cache. Randomization parameters to trade performance for security may also be passed as metadata from the operation 104, such as for use in the load or run time operations. These types of performance parameters and utilizing them in the load and runtime steps offer ASLR configurability to the user, a novel feature of DFASLR.

At operation 104, software hardening countermeasures can also be deployed. Gadgets that recombine parts of 2 adjoining instructions can be eliminated by choosing fragmentation points that divide up gadgets. When a jump type opcode (0xc2, 0xc3, 0xca, etc.) or pop+jmp sequence (gadgets typically must end in a jump to be useful) is identified, a new fragment can be started that begins with the opcode that contained the return\jump opcode.

Other software hardening countermeasures include inserting an invalid opcode after a jump instruction of a fragment. The invalid opcode can act as a guard instruction. These invalid opcodes can create pockets of traps to detect and thwart code-reuse attack attempts that do not precisely target the correct locations. These invalid opcodes also force instruction alignment, preventing code-reuse attacks from jumping in the middle of a fragment and continuing to the next fragment. If any gadgets that recombine instructions still remain within a fragment, these can be further nullified at this step through one or more nop instructions, such as can be a part of a nop-alignment sled (a series of consecutive no-operation (nop) instructions) to force alignment of the instruction that contains the return/jump opcode.

FIG. 3 illustrates, by way of example, a diagram of an embodiment of the code of FIG. 2 before and after operation 104. The illustrated operation 104 in FIG. 3 includes adding a guard instruction in the form of an invalid op code. Each of the fixed fragments 202A-202D is converted to a corresponding fixed fragment 302A-302D that includes an invalid opcode after the fixed instruction 202A-202D. Each of the relocatable fragments 204A-204D is converted to a corresponding relocatable fragment 304A-304D that includes an invalid opcode after the relocatable instruction 204A-204D. Fewer or more invalid opcodes may be used to pad each fragment, such as a random number of invalid opcodes being added to each fragment, a specified number of invalid opcodes being added to every other fragment, a specified number of invalid opcodes being added to only the relocatable fragments or the fixed fragments, or the like.

At operation 106, the location of the relocatable fragments 304A-304D can be randomized. At operation 106, the fragments can be connected, such as with jump instructions, to reconstitute the execution flow. During operation 106, additional covert techniques can be inserted, such as an application, function, or other code integrity check, a patch or update of code to reduce vulnerability of the application, code that is a trade secret or otherwise sensitive, proprietary, or confidential, stack frame padding, data rights management code, patch out functionality, or the like. For example, consider some code that is a trade secret, the code that is trade secret can be loaded at runtime. In another example, a stack frame padding can add (random) amounts of padding to stack frames to make it difficult to do buffer overflow types of attacks on stack variables. Patch out functionality can be added if, for example, a user has purchased a full version of a product, the functionality purchased can be added in, such as during runtime.

The operation 106 begins when an application is loaded into memory and finishes before the application starts executing. The operation 106 takes the output from the operation 104 and performs load time randomization of the code base.

The operation 106 can include (first) placing the fixed fragments 302A-302D generated in operation 104. For simplicity, the fixed fragments 302A-302D could be kept in the original locations. The location of the fixed fragments 302A-302D can be randomized. For example, the fixed fragments 302A-302D can be randomized in accord with other ASLR implementations, such as Windows and Linux ASLR. The fixed fragments 302A-302D in and of themselves do not contain gadgets. Due to DFASLR fragmentation, instructions within a function can be disjointed from the function start, removing any locality of reference. Thus, leaving the fixed fragments 302A-302D in the original locations do not present an inherent security risk.

The operation 106 can include, after the fixed fragments 302A-302D are placed, altering (e.g., randomizing) the locations of the relocatable fragments 304A-304D. If desired, the location alteration of the relocatable fragments 304A-304D can abide by rules set by the user during the build steps. This is discussed in further detail elsewhere herein.

FIG. 4 illustrates, by way of example, a diagram of a load operation that includes randomization of relocatable fragments. For simplicity of illustration, FIG. 4 illustrates a high-level example of the randomization of fragments, as performed at operation 106. In actual practice, the fixed fragments 302A-302D and the relocatable fragments 304A-304D can be finer grained than C statements, such as assembly instructions. The relocatable fragments 304A-304D and the fixed fragments 302A-302D can then be connected by direct jumps to reconstitute the original execution flow.

Figure 5:
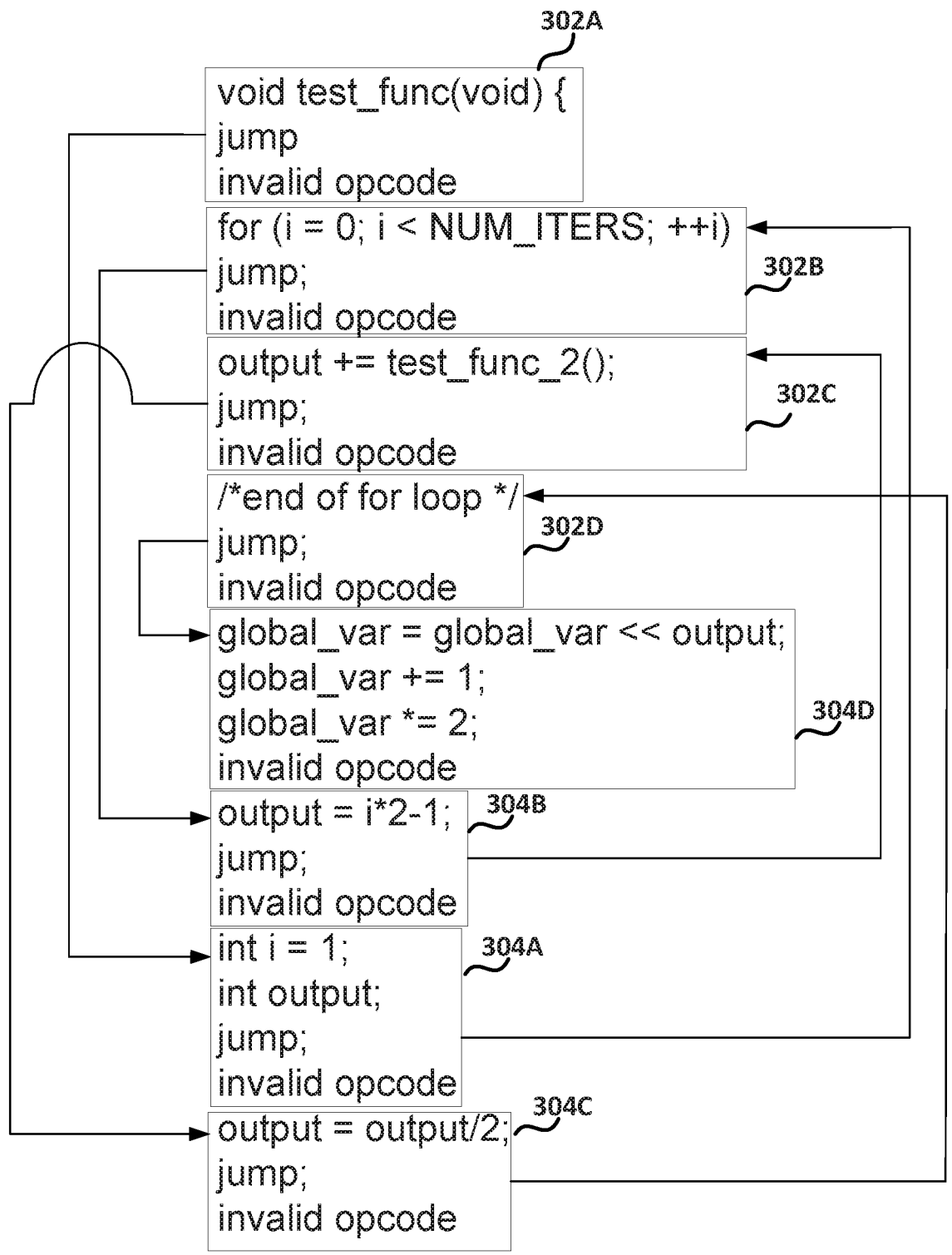
FIG. 5 illustrates, by way of example, a diagram of an embodiment of connecting the relocatable fragments and the fixed fragments using reference instructions.

FIG. 5 illustrates, by way of example, a diagram of an embodiment of connecting the relocatable fragments 304A-304D and the fixed fragments 302A-302D using jumps. The connecting of the fragments 302A-302D and 304A-304D can be performed at operation 106. The arrows represent direct jumps that are inserted after each fragment to lead to the next fragment. The connected fragments 302A-302D and 304A-304D of operation 106 can be thought of as a linked list of fragments 302A-302D and 304A-304D. Linked lists are ideal for insertion, removal, and reordering and can help enable techniques which are discussed in the following sections.

The operation 108 can continually re-randomize the relocatable fragments 304A-304D. The jump instructions of the relocatable fragments 304A-304D will not need to be changed as the fixed fragments 302A-302D can remain fixed. However, the jump instructions of the fixed fragments 302A-302D will need to be changed if they reference a jump to a relocatable fragment 304A-304D.

Metadata can be included with the code. The method 100 can include adding, at build time (e.g., operation 102 or 104), metadata to present parameters to the DFASLR operations 106 or 108 in the randomization. For instance, to improve performance, the user may specify that randomization of fragments per function should remain within the same page table entry to prevent page table thrashing. These sorts of parameters can be indicated in metadata.

For usability, the user can be in control of the trade between security and performance. For DFASLR, these parameters can be chosen before operation 102 and can influence the operations 102, 104, 106, and 108 of the method. For example, the user can have the capability to configure the granularity of the fragmentation as discussed elsewhere herein. The user can configure how the relocatable fragments 304A-304D are placed. The configurability of DFASLR to provide capability to trade performance for security is a novel feature.

The user, such as through a user interface, can provide configurable security and performance through user input regarding the granularity of randomization or the parameters of randomization. Parameters of randomization include placement of functionally grouped fragments (e.g., at a function or object level) into the same page table entry for performance, or placement of functionally grouped fragments into distinct page table entries to provide blinding against side channel analysis. The metadata can aid in making decisions to optimize for performance or security.

The operation 106 or 108 can provide the capability to update the code base at load time or run time through insertion of software patches or updates. Due, at least in part, to the linked list nature of the fragments 302A-302D and 304A-304D, patches to individual fragments 302A-302D and 304A-304D, whole functions, or new insertion of functions and code into the code base is as trivial as inserting a node into a linked list. Doing this while the application is running can be thought of as hot patching. Windows allows hot patching through dummy instructions before and at the beginning of a function, but this only allows for hot patching at the beginning of a function. DFASLR fragments allow hot patching at any fragment location, allowing for finer granularity hot patching.

A particular use case for load time or run time patching is to add covert techniques to an application. The operation 106 or 108 can include adding code from a covert technique into the code base to be executed. Examples of these techniques include instrumentation, cryptographic blinding, code obfuscation, or other extra security features that a system only wants available during runtime. By only loading these capabilities at load time or run time (e.g., at operation 106 or 108), this prevents open disclosure of these covert techniques to the developer. This also potentially allows for adaptive systems which patch code on the fly in response to cyberattacks. Covert techniques can be inserted by loading the techniques into memory, and then re-connecting the appropriate fragments to the loaded code. Due to the linked list nature of the fragments, inserting new fragments into the code flow is trivial.

Figure 6:
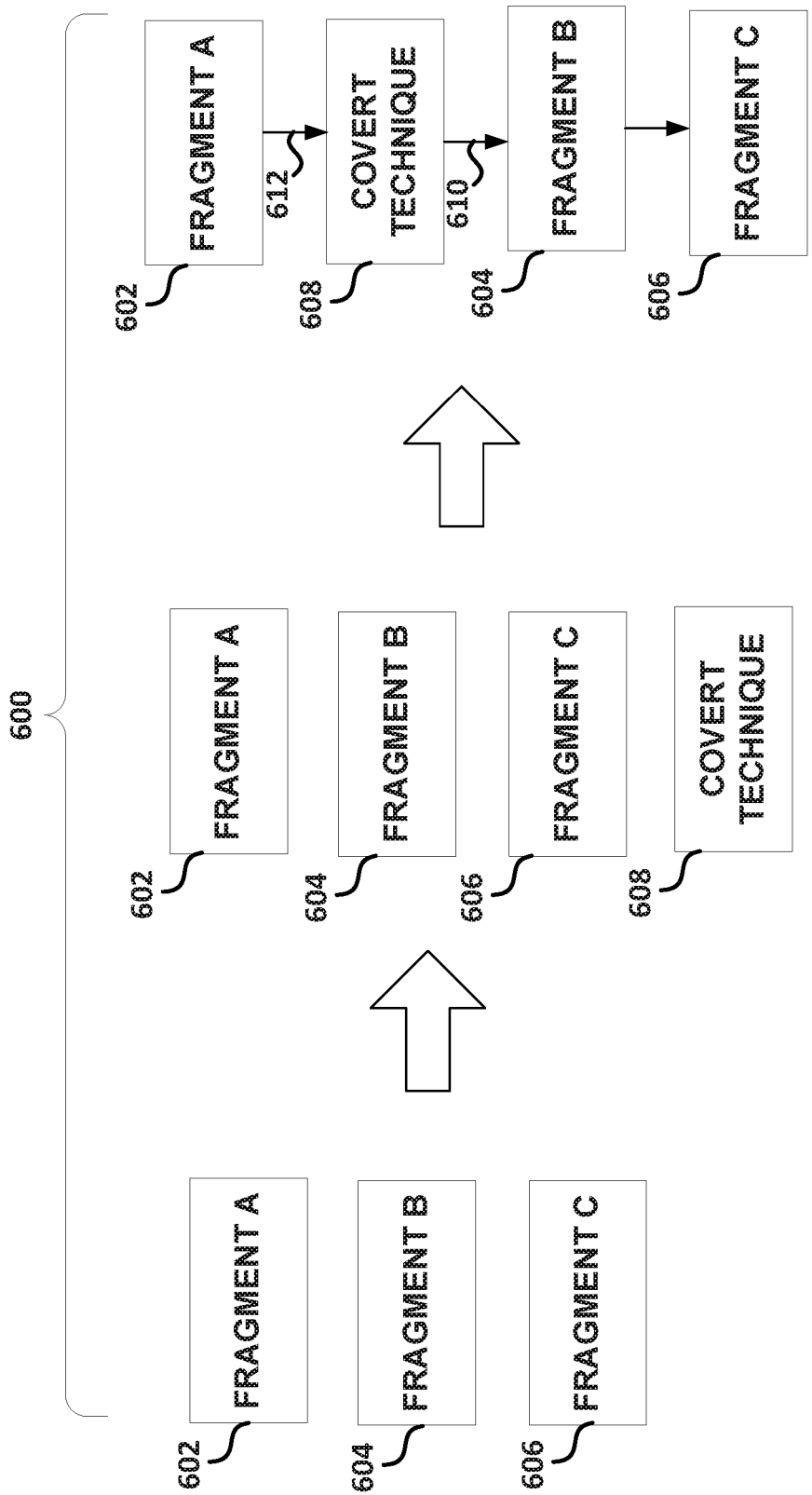
FIG. 6 illustrates, by way of example, a diagram of an embodiment of a technique 600 for covert technique insertion into a function.

FIG. 6 illustrates, by way of example, a diagram of an embodiment of a technique 600 for covert technique insertion into a function. The function is represented by fragments 602, 604, and 606. The fragments 602, 604, and 606 can be relocatable fragments 304A-304D or fixed fragments 302A-302D. The fragments 602, 604, and 606 can be loaded into execution memory. The convert technique 608 can be loaded into the execution memory at some point, whether before, after, or concurrently with one or more of the fragments 602, 604, or 606. The fragments 602, 604, and 606 and the covert technique 608 can then be connected, such as by jump instructions. The covert technique 608 can include a security check (e.g., a control flow integrity check, boundary check, or the like) to be performed on the function implemented by the fragments 602, 604, and 606 or a security check performed on the fragments 602, 604, 606 themselves.

At operation 106, the fragments 602, 604, and 606 can be loaded into execution memory. At operation 106, the covert technique 608 can be loaded into execution memory. At operation 106, a jump instruction from the covert technique 608 to a fragment 602, 604, or 606 can be added to the covert technique 608 (indicated by arrow 610). At operation 106, a jump instruction from a fragment 602, 604, or 606 can be added (indicated by arrow 612) after the jump instruction from the covert technique 608 to the fragment 602, 604, or 606. The covert technique 608 can thus be loaded into the execution memory at load time.

The operation 108 of embodiments allows for re-randomization of the relocatable fragments 304A-304D during program execution. This is true runtime ASLR, as it can be performed without halting or appreciably affecting the application. Runtime ASLR means the code is continuously being randomized, adding entropy to the application as it runs and foiling attempts to map the code. This presents a moving target for mapping and side channel attacks.

Figure 7:
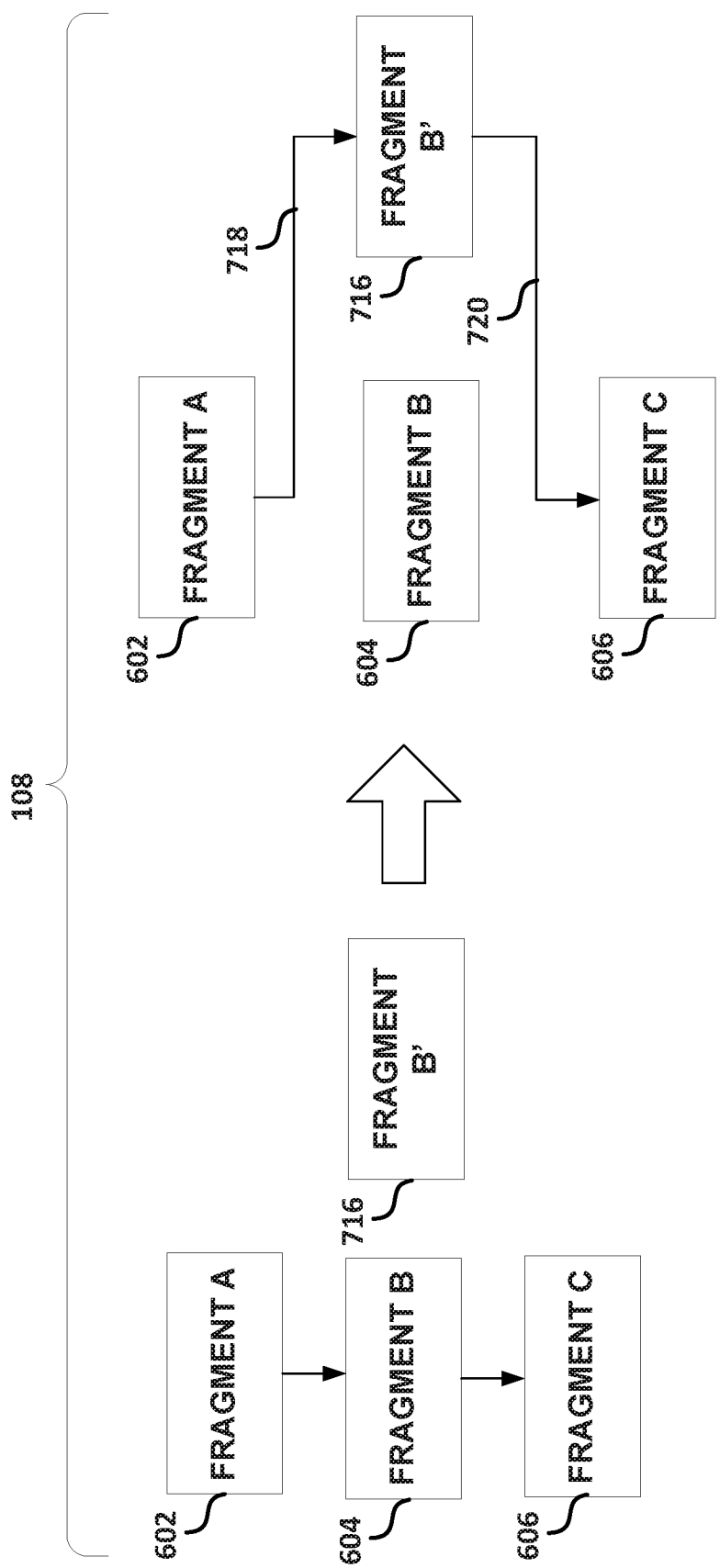
FIG. 7 illustrates, by way of example, a diagram of an embodiment of a runtime operation.

As previously discussed, at operation 108, a true runtime re-randomization of code fragments can be performed. FIG. 7 illustrates, by way of example, a diagram of an embodiment of the operation 108. The operation 108 can include runtime re-randomization of code fragments. Embodiments offer a true runtime re-randomization of the code layout. Since the relocatable fragments 304A-304D were identified by identifying all labels and references to labels in the code base, these relocatable fragments 304A-304D are position independent as they will only be referenced by a jump instruction, but are not referenced by any variables. Since there are no references to any locations within the relocatable fragments 304A-304D, the location of relocatable fragments 304A-304D can be re-randomized without requiring any fixup to any variables or data structures, the only updates are to jump instructions which are more easily updated than variable references. As relocatable fragments 304A-304D are chained in a linked list, insertion, removal, and reordering of the fragments at runtime can be easy. The runtime randomization of embodiments can be unique in that it does not require halting the application, is simple to implement, and does not require any fixup of variable references, only jump instruction destinations need to be updated.

The runtime DFASLR process can therefore be seen as a case of the replacement of a fragment in a linked list with the new location of the fragment. This process is illustrated in FIG. 7. In FIG. 7, the fragments 602, 604, and 606 are illustrated as loaded into execution memory along with a copy of the fragment 604 in a new location in execution memory as indicated by the fragment 716. The copy of the fragment 716 can already include a reference to the fragment 606 or the copy can be created before the jump instruction is added to the fragment 604. In some embodiments, the fragment 716 is linked to the fragment 606, such as by adding a jump instruction. After the fragment 716 is linked to the next consecutive fragment 606 to be executed, the fragment 602 can be linked to the fragment 716, such as by adding a jump instruction 720 or altering a destination of a jump instruction 718 to correspond to the beginning of the fragment 716.

As the fragments 602, 604, 606, 716, etc. allow for runtime re-randomization, covert techniques can be added at runtime after an application is running. The process can be similar to the load time covert technique insertion as discussed with regard to FIG. 6. The jump instruction destination from the covert technique to the next fragment can be updated before the jump instruction destination from the preceding fragment is connected to the covert technique. Operating in this order can allow for runtime insertion of code.

A number of attacks against ASLR have been proposed in academia and elsewhere. These attacks aim to defeat ASLR through reduction of entropy to the point of de-randomization of ASLR techniques. All attacks aim to discover the location of a known entity and then infer the location of other entities within the codebase, the ultimate goal being the location of gadgets. Once the location of any entity is identified, then code relative to that entity can be mapped.

A strength of embodiments against these attacks is the ability for the attacker to not understand the relative location of the code fragments. Embodiments provide resistance to these types of attacks due to the nature of the ability for embodiments to have a fine-grained randomization. By the nature of the fragmentation in embodiments, all locality of reference between fragments can be removed. Any mapping of an entity within the code base only reveals the location of code within that particular fragment. For example, if an attacker discovered the address of function foo( ), this would only disclose the first instruction or first fragment of function foo( ). Embodiments can randomize and relocate other contents of foo( ). Even though foo( ) might have been located, the ultimate goal of these attacks, the location of gadgets is not achieved.

In addition, the runtime re-randomization of embodiments presents a moving target for attackers. Any information gleaned by the attacker has a shelf life. Runtime re-randomization of a fragment will invalidate any information an attacker has discovered about that fragment.

The following discusses some notable state of the art ASLR defeating techniques and how embodiments are resistant, immune, or reduce the impact of a successful attack.

Side-Channel attacks such as AnC, memory deduplication, thread or heap spray all attack ASLR by reducing the entropy of ASLR, ultimately aiming to map the relocated modules/code base and locate gadgets. For example, thread and heap spraying repeatedly spawn threads or allocate memory in order to map out unallocatable holes of memory. These holes are candidates for the randomized location of the code base.

AnC reduces entropy through side-channel analysis of page table allocations. This relies on the architecture of x86 page table entries to reveal the address of functions or references within the code base. Attacks, such as thread and heap spray reveal the location of the code base. This reveals no information on the location of the gadgets within, as embodiments remove all locality of reference. Fragments are no longer relatively located or associated in any calculable manner to the start of the original code base.

The covert technique insertion capability of DFASLR allows for insertion of "blinding fragments." Blinding fragments can be functionally benign but affect cache and page table utilization. Examples can include a fragment that does a cache touch on random cache lines, or placement of extra fragments to introduce extra cache line and page table allocations due to the fragment being pulled into the cache during execution.

Embodiments also effectively include side-channel blinding for attacks such as AnC. Side-channel analysis requires knowledge of the characteristics of the process and knowledge of some or all of the inputs. The more uncertainty in the inputs, the noisier the data and more difficult the analysis. Due, at least in part, to fragmentation in embodiments, multiple page table entries will be pulled into cache as a function executes. Uncertainty in the inputs and noise from embodiments effectively adds side-channel blinding to prevent side these types of channel attacks.

Similar to side-channel attacks, information and memory disclosure attacks aim to defeat ASLR by mapping the address of a known entity. Once that location is known, all code relative to that entity can then be calculated. As mentioned above, embodiments reduce the impact of these types of attacks as only the instructions within the located fragment can be inferred. The location of instructions in other fragments is not calculable.

Embodiments do incur extra runtime overhead and performance costs. Each fragment adds at least one additional jump instruction to connect the fragment to the next fragment. The performance cost of linking fragments is inversely proportional to the size of a single fragment, with a larger fragment size increasing execution time less than a smaller fragment size. As embodiments allow for configurability of fragmentation size, a user can trade performance for security or vice versa.

Another performance overhead associated with fragmentation of embodiments is the overhead for additional page table lookups and possible reduction in cache performance. If fragments are not multiples of a cache line size, then cache utilization will be suboptimal. In addition, functions usually have relatively uniform cache set usage due to the linearity of code. Fragmentation can cause some additional unevenness in the cache set utilization, although statistically the randomness of fragment placement will cause this effect to be normalized. Choosing cache line multiples for the fragmentation size (−1 instruction for the linking jmp instruction) will mostly eliminate the cache performance overhead.

Overhead associated with extra page table walks can also be mitigated at the cost of security. Choosing a relocation scheme that reorders fragments that belong to the same function within the same page table entry (e.g., each page table maps 4 KB) would prevent any extra page table walks over the original code. However, this would potentially weaken the blinding that embodiments offer with regard to attacks, such as AnC. To introduce the most noise and protect optimally against attacks such as AnC, the user would set the randomization policy to place fragments within the same function at different 4 KB blocks.

In sum, embodiments can provide a feasible configurable granularity ASLR technique, offering randomization that can be as granular as every instruction. This results in extremely high code diversity/entropy which prevents side-channel and memory disclosure attacks from succeeding. By disjointing the code into small fragments, embodiments can remove locality, even between instructions within a function. Even if an attacker succeeds in a memory disclosure or side channel attack, the granularity of embodiments means that only the location of one fragment will be revealed. Additionally, the granularity of embodiments adds noise to side channel analysis attacks and removes knowledge of the reference being analyzed. As code is executed and fragments are traversed, multiple page table entries and cache lines can be used in a manner unknown to the attacker. Uncertainty in the inputs and noise from embodiments, thus effectively adds side-channel blinding to prevent side channel attacks such as cache or page table side channel analysis.

Figure 8:
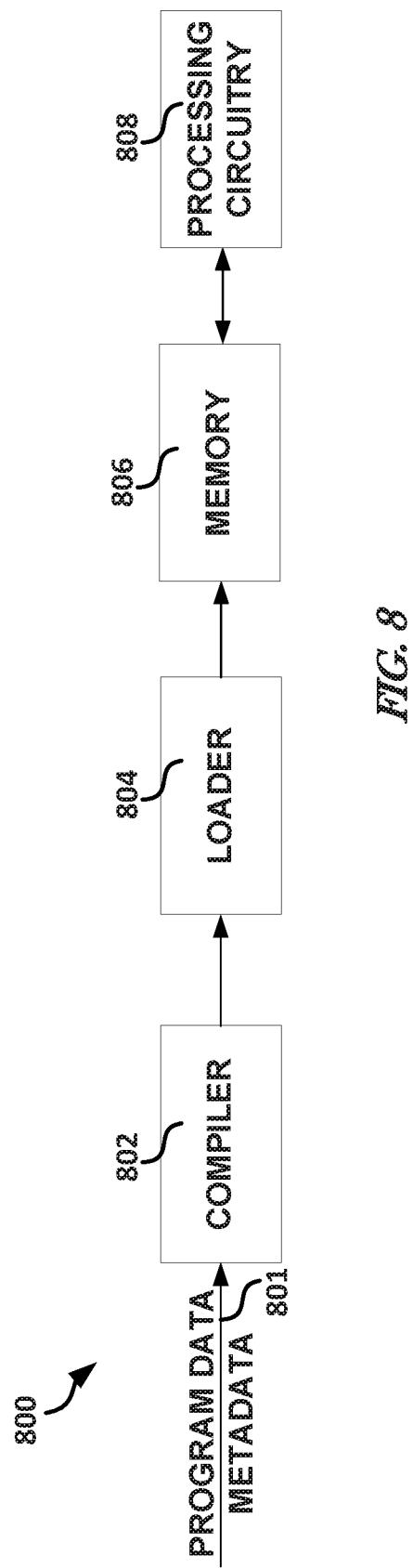
FIG. 8 illustrates, by way of example, a diagram of an embodiment of a system to implement a method or technique, such as those discussed about FIG. 1 and elsewhere herein can be implemented.

FIG. 8 illustrates, by way of example, a diagram of an embodiment of a system 800 for performing the method 100. The system 800 as illustrated includes a compiler 802, a loader 804, a memory 806, and processing circuitry 808. The compiler 802 receives program data to be compiled and optional metadata 801. The metadata can indicate a granularity of the fragmentation to be performed. For example, the metadata can specify a minimum number of instructions to be included in a fragment, such as one or more instructions.

The compiler 802 is a program that converts higher-level instructions into a machine-code or a lower-level form. The code form allows the processing circuitry 808 to execute the instructions and is sometimes called an executable program. Types of compilers includes a cross-compiler, bootstrap compiler, standard compilers, source-to-source compilers, or the like. Compilers typically perform preprocessing, lexical analysis, parsing, semantic analysis, conversion of input program to an intermediate representation, code optimization, and code generation. The compiler 802 can perform at least one of operations 102 and 104.

The loader 804 receives the executable program from the compiler 802. The loader 804 is a part of an operating system (OS) that is responsible for loading programs and libraries. The loader 804 places instructions into the memory 806. The loader 804 can perform at least one of operations 104 and 106.

The memory 806 can include a random access memory (RAM). The memory 806 can store the executable program from the loader 804. The loader 804 can alter the location a fragment 302A-302D or 304A-304D is stored in the memory 806. The loader 804 can perform operation 106.

The processing circuitry 808 can include a hardware processor, such as can include a central processing unit (CPU), a graphics processing unit (GPU), an application specific integrated circuit (ASIC), circuitry, such as one or more transistors, resistors, capacitors, inductors, diodes, logic gates, multiplexers, oscillators, buffers, modulators, regulators, amplifiers, demodulators, or the like. The processing circuitry 808 can execute the executable program stored in the memory 806. The processing circuitry 808 can perform operation 108, such as by altering an execution flow of the executable program stored on the memory 806.

Figure 9:
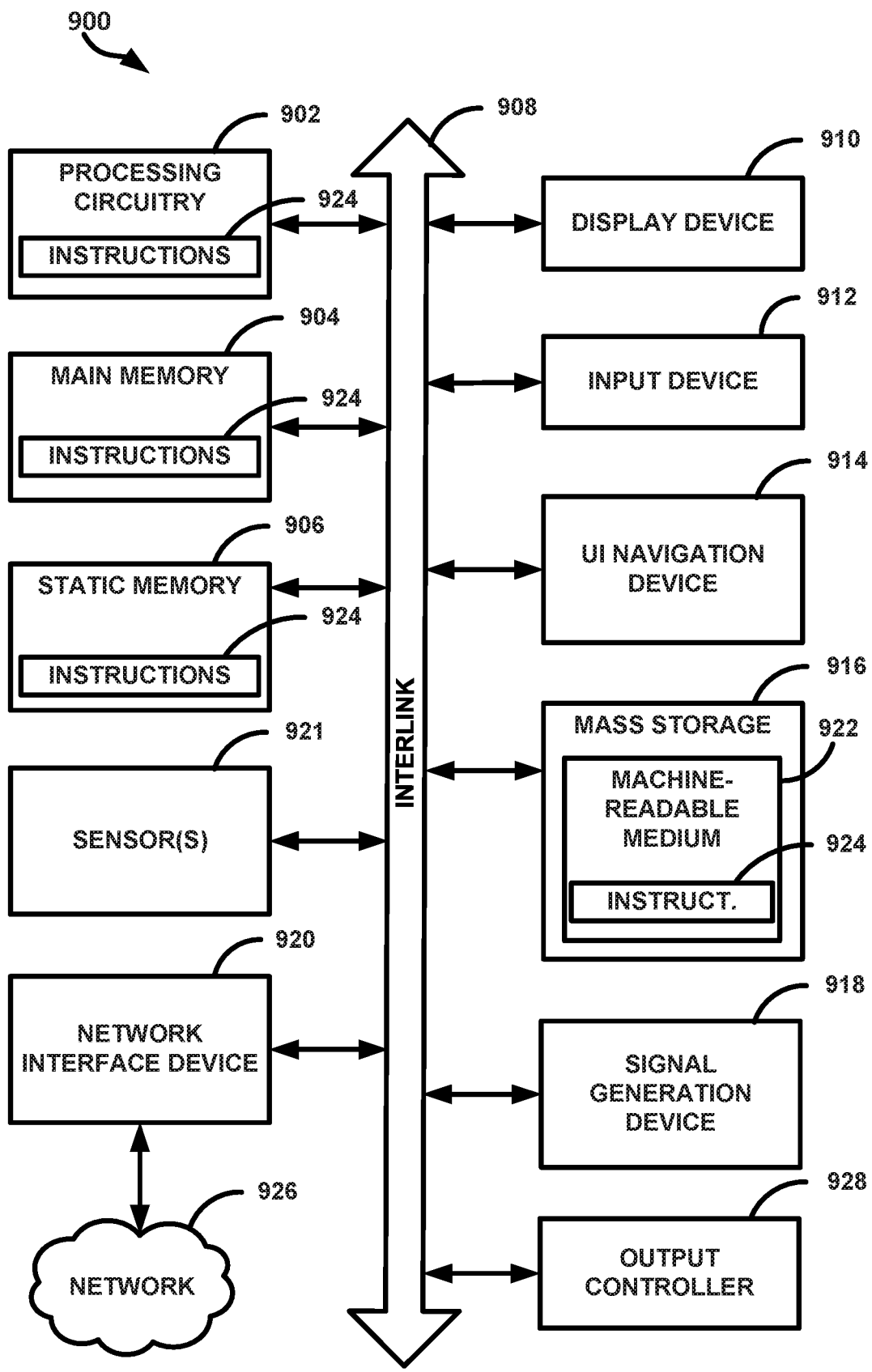
FIG. 9 illustrates, by way of example, a block diagram of an embodiment of a machine on which one or more of the methods, such as those discussed about FIGS. 1-7 and elsewhere herein can be implemented.

FIG. 9 illustrates, by way of example, a block diagram of an embodiment of a machine 900 on which one or more of the methods, such as those discussed about FIGS. 1-7 and elsewhere herein can be implemented. In one or more embodiments, one or more items of the system 800 can be implemented by the machine 900. In alternative embodiments, the machine 900 operates as a standalone device or may be connected (e.g., networked) to other machines. In one or more embodiments, one or more items of the system 800 can include one or more of the items of the machine 900. In a networked deployment, the machine 900 may operate in the capacity of a server or a client machine in server-client network environment, or as a peer machine in a peer-to-peer (or distributed) network environment. The machine 900 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 900 includes processing circuitry 902, such as can be similar to the processing circuitry 808, (e.g., a hardware processor, such as can include a CPU, a GPU, an ASIC, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like). The machine 900 can include sensors 921 (e.g., a transducer that converts one form of energy (e.g., light, heat, electrical, mechanical, or other energy) to another form of energy), or the like, or a combination thereof), a main memory 904 and a static memory 906, which communicate with each other and all other elements of machine 900 via a bus 908. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like. The RF transmit circuitry can be configured to produce energy at a specified primary frequency to include a specified harmonic frequency.

The machine 900 (e.g., computer system) may further include a video display device 910 (e.g., a liquid crystal display (LCD) or a cathode ray tube (CRT)). The machine 900 also includes an alphanumeric input device 912 (e.g., a keyboard), a user interface (UI) navigation device 914 (e.g., a mouse), a disk drive or mass storage unit 916, a signal generation device 918 (e.g., a speaker) and a network interface device 920.

The mass storage unit 916 includes a machine-readable medium 922 on which is stored one or more sets of instructions and data structures (e.g., software) 924 embodying or utilized by any one or more of the methodologies or functions described herein, such as those discussed about FIGS. 1-7. The instructions 924 may also reside, completely or at least partially, within the main memory 904, the static memory 906, and/or within the processing circuitry 902 during execution thereof by the machine 900, with the main memory 904, the static memory 906, and the processing circuitry 902 also constituting machine-readable media. One or more of the main memory 904, the mass storage unit 916, or other memory device can store the job data, transmitter characteristics, or other data for executing the method of FIGS. 1-7.

The machine 900 as illustrated includes an output controller 928. The output controller 928 manages data flow to/from the machine 900. The output controller 928 is sometimes called a device controller, with software that directly interacts with the output controller 928 being called a device driver.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, such as those discussed regarding FIGS. 1-7, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of several well-known transfer protocols (e.g., hypertext transfer protocol (HTTP), user datagram protocol (UDP), transmission control protocol (TCP)/internet protocol (IP)). The network 926 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

EXAMPLES AND ADDITIONAL NOTES

Example 1 can include a device configured to perform dynamic fragmented address space layout randomization, the device comprising a memory to store instructions of an application to be executed, the instructions including fixed instructions and relocatable instructions, processing circuitry to implement a compiler to identify the fixed instructions and the relocatable instructions, the fixed instructions reference another instruction of the instructions and the relocatable instructions do not reference another instruction of the instructions, to implement a loader to alter a location of the relocatable instructions relative to one another in the memory and add respective reference instructions to the fixed instructions and relocatable instructions that cause the instructions to be executed in a same order as they would be if the location was not altered, and execute the fixed instructions and the relocatable instructions from their altered locations in the memory.

In Example 2, Example 1 further includes, wherein the instructions are assembly code instructions.

In Example 3, at least one of Examples 1-2 further includes, wherein the loader is further to add an invalid op code after at least one of the reference instructions.

In Example 4, at least one of Examples 1-3 further includes, wherein the processing circuitry is further to, during execution of the application, alter the location of one or more of the relocatable instructions and update a corresponding reference instruction of one or more of the fixed instructions that references the respective relocatable instruction.

In Example 5, at least one of Examples 1-4 further includes, wherein the processing circuitry is further to, during execution of the application, execute additional instructions that were not loaded into the memory by the loader at load time.

In Example 6, Example 5 further includes, wherein the additional instructions cause the processing circuitry to execute a security check on the application.

In Example 7, Example 5 further includes, wherein the additional instructions cause the processing circuitry to change a relocatable instruction to patch a vulnerability of the application.

In Example 8, at least one of Examples 1-7 further includes, wherein at least one of the fixed instructions and at least one of the relocatable instructions include only a single instruction.

In Example 9, at least one of Examples 1-8 further includes, wherein the compiler is further to identify a return opcode in the instructions and create a new fragment that begins with return opcode.

In Example 10, Example 9, wherein the compiler is further to insert nop instructions immediately before the identified return opcode.

In Example 11, at least one of Examples 1-10 further includes, wherein the device further comprises a user interface through which a user can specify a number of instructions to be included in a relocatable fragment, the relocatable fragment including consecutive relocatable instructions, and wherein the loader alters the location of the relocatable instructions through relocation of the relocatable fragments.

Example 12 includes at least one non-transitory machine-readable medium including instructions that, when executed by a machine, cause the machine to perform operations comprising identify fixed instructions of the instructions and relocatable instructions of the instructions, the fixed instructions reference another instruction of the instructions and the relocatable instructions do not reference another instruction of the instructions, alter the location of the relocatable instructions relative to one another in the memory and add respective reference instructions to the fixed instructions and relocatable instructions that cause the instructions to be executed in a same order as they would be if the location was not altered, and execute the fixed instructions and the relocatable instructions from their altered locations in the medium.

In Example 13, Example 12 further includes, wherein the instructions are assembly code instructions.

In Example 14, at least one of Examples 12-13 further includes, wherein the operations further include add an invalid op code after at least one of the reference instructions.

In Example 15, at least one of Examples 12-14 further include, wherein the operations further include, during execution of the application, alter the location of one or more of the relocatable instructions and update a corresponding reference instruction of one or more of the fixed instructions that references the respective relocatable instruction.

In Example 16, at least one of Examples 12-15 further includes, wherein the operations further include, during execution of the application, execute additional instructions that were not loaded into the medium by a loader at load time.

In Example 17, Example 16 further includes, wherein the additional instructions cause the machine to execute a security check on the application or change a relocatable instruction to patch a vulnerability of the application.

Example 18 includes a method for dynamic fragmented address space layout randomization, the method executed by a computer device, the method comprising identifying fixed instructions of the instructions and relocatable instructions of the instructions, the fixed instructions reference another instruction of the instructions and the relocatable instructions do not reference another instruction of the instructions, altering the location of the relocatable instructions relative to one another in the memory and add respective reference instructions to the fixed instructions and relocatable instructions that cause the instructions to be executed in a same order as they would be if the location was not altered, and executing the fixed instructions and the relocatable instructions from their altered locations in the medium.

In Example 19, Example 18 further includes, wherein at least one of the fixed instructions and at least one of the relocatable instructions include only a single instruction.

In Example 20, at least one of Examples 18-19 further includes, wherein the method further comprises breaking up the instructions into distinct fragments, the number of instructions in a fragment determined based on metadata.

In Example 21, at least one of Examples 18-20 further includes, identifying a return opcode in the instructions and creating a new fragment that begins with return opcode.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device configured to perform dynamic fragmented address space layout randomization, the device comprising:
   a memory to store instructions of an application to be executed, the instructions including fixed instructions and relocatable instructions; processing circuitry to:
   implement a compiler to identify the fixed instructions and the relocatable instructions, the fixed instructions reference another instruction of the instructions and the relocatable instructions do not reference another instruction of the instructions;
   implement a loader to alter a location of the relocatable instructions relative to one another in the memory and add respective reference instructions to the application that cause the instructions to be executed in a same order as they would be if the location was not altered; and
   execute the fixed instructions and the relocatable instructions from their altered locations in the memory.

2. The device of claim 1, wherein the instructions are assembly code instructions.

3. The device of claim 1, wherein the loader is further to add an invalid op code after at least one of the reference instructions.

4. The device of claim 1, wherein the processing circuitry is further to, during execution of the application, alter the location of one or more of the relocatable instructions and add a jump instruction to the application that references the altered location of the relocatable instruction.

5. The device of claim 1, wherein the processing circuitry is further to, during execution of the application, execute additional instructions that were not loaded into the memory by the loader at load time.

6. The device of claim 5, wherein the additional instructions cause the processing circuitry to execute a security check on the application.

7. The device of claim 5, wherein the additional instructions cause the processing circuitry to change a relocatable instruction to patch a vulnerability of the application.

8. The device of claim 1, wherein at least one of the instructions includes only a single instruction.

9. The device of claim 1, wherein the compiler is further to identify a return opcode in the instructions and create a new fragment that begins with return opcode.

10. The device of claim 9, wherein the compiler is further to insert nop instructions immediately before the identified return opcode.

11. The device of claim 1, wherein the device further comprises a user interface through which a user can specify a number of instructions to be included in a relocatable fragment, the relocatable fragment including consecutive relocatable instructions, and wherein the loader alters the location of the relocatable instructions through relocation of the relocatable fragments.

12. At least one non-transitory machine-readable medium including instructions that, when executed by a machine, cause the machine to perform operations comprising:
   identify fixed instructions of instructions and relocatable instructions of the instructions, the fixed instructions reference another instruction of the instructions and the relocatable instructions do not reference another instruction of the instructions;
   alter the location of the relocatable instructions relative to one another in the memory and add respective reference instructions to the application that cause the instructions to be executed in a same order as they would be if the location was not altered; and
   execute the fixed instructions and the relocatable instructions from their altered locations in the medium.

13. The machine-readable medium of claim 12, wherein the instructions are assembly code instructions.

14. The machine-readable medium of claim 12, wherein the operations further include add an invalid op code after at least one of the reference instructions.

15. The machine-readable medium of claim 12, wherein the operations further include, during execution of the application, alter the location of one or more of the relocatable instructions and add a jump instruction to the application that references the altered location respective relocatable instruction.

16. The machine-readable medium of claim 12, wherein the operations further include, during execution of the application, execute additional instructions that were not loaded into the medium by a loader at load time, wherein the additional instructions cause the machine to execute a security check on the application or change a relocatable instruction to patch a vulnerability of the application.

17. A method for dynamic fragmented address space layout randomization, the method executed by a computer device, the method comprising:
   identifying fixed instructions of instructions and relocatable instructions of the instructions, the fixed instructions reference another instruction of the instructions and the relocatable instructions do not reference another instruction of the instructions;
   altering the location of the relocatable instructions relative to one another in the memory and add respective reference instructions to the application that cause the instructions to be executed in a same order as they would be if the location was not altered; and
   executing the fixed instructions and the relocatable instructions from their altered locations in the medium.

18. The method of claim 17, wherein the method further comprises breaking up the instructions into distinct fragments, the number of instructions in a fragment determined based on metadata.

19. The method of claim 18, further comprising identifying a return opcode in the instructions and creating a new fragment that begins with return opcode.

20. The method of claim 17, further comprising identifying a return opcode in the instructions and creating a new fragment that begins with return opcode.

21. The method of claim 20, further comprising inserting nop instructions immediately before the identified return opcode.

* * * * *